United States Patent
Shetty et al.

(10) Patent No.: US 10,466,375 B2
(45) Date of Patent: Nov. 5, 2019

(54) AUTOMATIC METHOD FOR THREE-DIMENSIONAL STRUCTURAL INTERPRETATION OF BOREHOLE IMAGES ACQUIRED IN HIGH-ANGLE AND HORIZONTAL WELLS

(71) Applicant: Schlumberger Technology Corporation, Sugar Land, TX (US)

(72) Inventors: Sushil Shetty, Arlington, MA (US); John Rasmus, Richmond, TX (US); Christopher Edward Morriss, Sugar Land, TX (US); Koji Ito, Sugar Land, TX (US); Shahzad Asif, Richmond, TX (US); Vittorio Picco, Chicago, IL (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 502 days.

(21) Appl. No.: 15/122,376

(22) PCT Filed: Feb. 27, 2015

(86) PCT No.: PCT/US2015/017930
§ 371 (c)(1),
(2) Date: Aug. 29, 2016

(87) PCT Pub. No.: WO2015/131016
PCT Pub. Date: Sep. 3, 2015

(65) Prior Publication Data
US 2016/0370480 A1    Dec. 22, 2016

Related U.S. Application Data

(60) Provisional application No. 61/946,662, filed on Feb. 28, 2014.

(51) Int. Cl.
*G01V 1/30* (2006.01)
*G01V 1/50* (2006.01)
(Continued)

(52) U.S. Cl.
CPC ............... *G01V 1/30* (2013.01); *G01V 1/50* (2013.01); *G01V 1/34* (2013.01); *G01V 3/18* (2013.01); *G01V 5/04* (2013.01)

(58) Field of Classification Search
CPC ................................. G01V 1/30; G01V 1/34
See application file for complete search history.

(56) References Cited

U.S. PATENT DOCUMENTS 6,125,203 A   9/2000  Keskes et al.
6,226,595 B1  5/2001  Rossi et al.
(Continued)

FOREIGN PATENT DOCUMENTS

WO    WO2013066682 A1    5/2013

OTHER PUBLICATIONS

Mendoza, Inversion of Sector-Based LWD Density Measurements Acquired in Laminated Sequences Penetrated by Highangle and Horizontal Wells, SPWLA 501 h Annual Logging Symposium, Jun. 21-24, 2009.*

(Continued)

*Primary Examiner* — Michael J Dalbo

(57) ABSTRACT

A method for automatic interpretation of bulls-eye and sinusoidal features observed in LWD images is disclosed. In some embodiments, the method includes an automatic workflow for extracting smooth contours from images that demarcate boundaries of structural features, followed by projection of the contours to three-dimensional (3D) point clouds in the well coordinate system for structural interpretation. The method may characterize both sinusoidal features and bulls-eye features, taking into account variations (Continued)

of formation dip/azimuth, or well inclination/azimuth, on the topology of a structural feature. The disclosed method may be sufficiently fast for use in real-time analysis and interpretation, or to provide constraints for physics-based data inversion processing.

18 Claims, 16 Drawing Sheets

(51) Int. Cl.
    *G01V 1/34*    (2006.01)
    *G01V 3/18*    (2006.01)
    *G01V 5/04*    (2006.01)

(56) References Cited

U.S. PATENT DOCUMENTS

| | | |
|---|---|---|
| 2006/0203872 A1 | 9/2006 | Oka |
| 2007/0199721 A1 | 8/2007 | Givens et al. |
| 2010/0004867 A1 | 1/2010 | Zhou et al. |
| 2011/0105899 A1* | 5/2011 | Vray .................... G06K 9/4638 600/439 |
| 2011/0282634 A1* | 11/2011 | Marza .................... G06T 17/05 703/2 |
| 2012/0143522 A1 | 6/2012 | Chen et al. |
| 2013/0030777 A1* | 1/2013 | Sung .................... G01V 99/00 703/6 |
| 2013/0170713 A1 | 7/2013 | Kumar et al. |
| 2014/0254884 A1* | 9/2014 | Elkington ................ G01V 1/42 382/109 |
| 2015/0035536 A1* | 2/2015 | Tang ........................ G01V 3/20 324/339 |

OTHER PUBLICATIONS

Shetty, Inversion-Based Workflows for Interpretation of Nuclear Density Images in High-Angle and Horizontal Wells, SPWLA 53rd Annual Logging Symposium, Jun. 16-20, 2012.*
Liu, Improved borehole image dip calculation in irregularly shaped and curved boreholes in high-angle and lorizontal wells. SPWLA 51st Annual Logging Symposium, Jun. 19-23, 2010.*
International Preliminary Report on Patentability issued in PCT/US2015/017930 dated Sep. 6, 2016. 6 pages.
Liu et al., Improved borehole image dip calculation in irregularly shaped and curved boreholes in high-angle and horizontal wells. SPWLA 51st Annual Logging Symposium, Jun. 19-23, 2010.
Lorenson et al., A high resolution 3D surface construction algorithm. In SIGGRAPH '87 Proceedings of the 14th annual conference on Computer graphics and interactive techniques, vol. 21, pp. 163-169, Jul. 1987.
Passey et al., Overview of high-angle and horizontal well formation evaluation: Issues, learnings, and future directions. In SPWLA 46th Annual Logging Symposium, Jun. 26-29, 2005.
International Search Report and Written Opinion issued in PCT/US2015/017930 dated May 29, 2015. 9 pages.
Search and Examination Report Rule 62 EPC issued in European Patent Application 15755263.9 dated Nov. 6, 2017, 8 pages.
Examination Report 94(3) EPC issued in European Patent Application 15755263.9 dated Feb. 21, 2019, 6 pages.

* cited by examiner

AUTOMATIC METHOD FOR THREE-DIMENSIONAL STRUCTURAL INTERPRETATION OF BOREHOLE IMAGES ACQUIRED IN HIGH-ANGLE AND HORIZONTAL WELLS

CROSS REFERENCE TO RELATED APPLICATIONS

Priority is claimed from U.S. Provisional Application 61/946,662 filed on Feb. 28, 2014.

STATEMENT REGARDING FEDERALLY SPONSORED RESEARCH OR DEVELOPMENT

Not Applicable.

BACKGROUND

This disclosure is related to the field of well logging instruments having sensors that make measurements usable to generate an equivalent of a visual image of a wall of a wellbore through which the instrument is moved. More specifically, the disclosure relates to methods and systems for processing such measurements to automatically identify certain types of geologic features from the measurements. This section is intended to introduce the reader to various aspects of the technical field of the disclosure that may be related to the subject matter described and/or claimed below. This section is believed to be helpful in providing the reader with background information to facilitate a better understanding of the various aspects of the present disclosure. Accordingly, it should be understood that these statements are to be read in this context, and are not to be construed as admissions of prior art.

Well logging instruments are used in wellbores drilled through subsurface formations to make, for example, measurements of selected physical parameters of the formations to infer properties of the formations surrounding the wellbore and the fluids in void spaces in the formations. Well logging instruments known in the art include electromagnetic tools, nuclear tools, acoustic tools, and nuclear magnetic resonance (NMR) tools, though various other types of tools for evaluating formation properties are also known.

Well logging instruments may be deployed in and moved along the interior of a wellbore on an armored electrical cable ("wireline") after the wellbore has been drilled. Present versions of such "wireline" well logging instruments are still used extensively. However, as the demand for information during the drilling of a wellbore continues to increase, measurement-while-drilling (MWD) tools and logging while drilling (LWD) instruments have been developed to fulfill such demand. MWD tools are generally defined as those making measurements of drilling parameters such as axial force (weight) on a bit used to drill the wellbore, torque applied to a drill string, wellbore temperature, wellbore fluid pressure, and well trajectory direction and inclination. LWD instruments are generally defined as those which make formation parameter measurements such as electrical resistivity, fractional volume of pore space in the formations ("porosity"), acoustic velocity, density, neutron hydrogen index and/or capture cross-section and NMR relaxation time distributions, among other measurements. MWD and LWD instruments often have sensors similar in nature to those found in wireline instruments (e.g., transmitting and receiving antennas, sensors, etc.), but MWD and LWD tools are designed and constructed to operate in the harsh environment of wellbore drilling.

Well logging measurements may be processed to form images. Such processing may include plotting values of one or more well logging measurements in the form of gray scale or color scale with respect to both axial position in the wellbore (measured depth) and circumferential orientation within the wellbore. Logging-while-drilling (LWD) images acquired in highly inclined or horizontal wellbores may be characterized by various features that are sensitive to formation geologic structure near the wellbore. In well log data processing known in the art, image features commonly referred to as "sinusoids", "bulls-eyes", or "reverse bulls-eyes" may extracted from the images manually. However, manual feature extraction is time consuming and prone to user bias. This is of particular concern in highly inclined and/or horizontal wells, where small errors in determining formation layering angle with respect to horizontal ("structural dip") may translate into large errors in calculated formation reservoir volumetrics. See, for example, Q. R. Passey et al., *Overview of High-Angle and Horizontal Well Formation Evaluation: Issues, Learnings, and Future Directions*, SPWLA 46th Annual Logging Symposium, Jun. 26-29, 2005. Furthermore, "bulls-eye" features have been observed extending for hundreds of feet in measured depth (axial length along the wellbore). It is therefore important to account for changes in both wellbore trajectory inclination and geodetic or geomagnetic direction ("azimuth"), and formation dip/azimuth, in the structural interpretation of such formations.

SUMMARY

A summary of example embodiments disclosed herein is set forth below. It should be understood that these embodiments are presented only to provide the reader with a brief summary of the subject matter and that the disclosed embodiments are not intended to limit the scope of this disclosure. The disclosure may encompass a variety of aspects and embodiments that may not be set forth herein.

The present disclosure sets forth example methods for automatic structural interpretation of bulls-eye and sinusoidal features observed in logging while drilling (LWD) images acquired in highly inclined and/or horizontal wellbores. In accordance with example embodiments, the method is based on an automatic workflow for extracting smooth contours from LWD images that demarcate boundaries of structural features, followed by projection of the boundary contours to three-dimensional (3D) point clouds in the wellbore coordinate system for structural interpretation. The method may characterize both sinusoidal features and bulls-eye features, taking into account variations of formation dip/azimuth, or wellbore inclination/azimuth, on the topology of a structural feature. Compared to methods known in the art prior to the present disclosure, methods described in the present disclosure may have a processing time of as little as a few seconds for a hundred feet (30 meters) of wellbore image data. Accordingly, example methods disclosed herein may be sufficiently fast for use in real-time analysis and interpretation, or to provide constraints for physics-based well log data inversion processing.

In accordance with aspects of the present disclosure, the effect of well logging instrument eccentering on the accuracy of formation dip estimated from sinusoidal features may also be quantified. Based on a geometric model, it has been found that logging instrument eccentering perturbs the shape of an image of a geologic feature from a simple sinusoid. However, when eccentering is ignored, it has been observed that errors in estimated apparent relative dip and apparent azimuth are less than a few tenths of a degree for many highly inclined or horizontal well logging situations.

In one embodiment, a method includes acquiring an azimuthally substantially continuous wellbore image using a well logging instrument disposed in a wellbore penetrating a subsurface formation. The method includes using a processor to process the azimuthally substantially continuous borehole image for extraction of contours, to group the extracted contours into clusters corresponding to a single transition zone, and to map the extracted contours having a measured depth interval (axial extent) that is greater than a length-scale over which the dip of the subsurface formation varies to a three-dimensional space corresponding to a coordinate system associated with the wellbore. Extracted contours having a measured depth interval that is less than the length-scale over which the dip of the subterranean formation varies, using the processor to estimate relative formation dip and apparent azimuth based on a first harmonic approximation of a contour.

The brief summary presented above is intended to familiarize the reader with certain aspects and contexts of embodiments of the present disclosure without limitation to the claimed subject matter.

DETAILED DESCRIPTION

One or more example embodiments according to the present disclosure are described below. The disclosed embodiments are merely examples of the presently disclosed subject matter. Additionally, in an effort to provide a concise description of such embodiments, all features of an actual implementation may not be described in the specification. It should be appreciated that in the development of any such implementation, as in any engineering or design project, numerous implementation-specific decisions may be made to obtain the developers' specific objectives, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of the present disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

Figure 1:
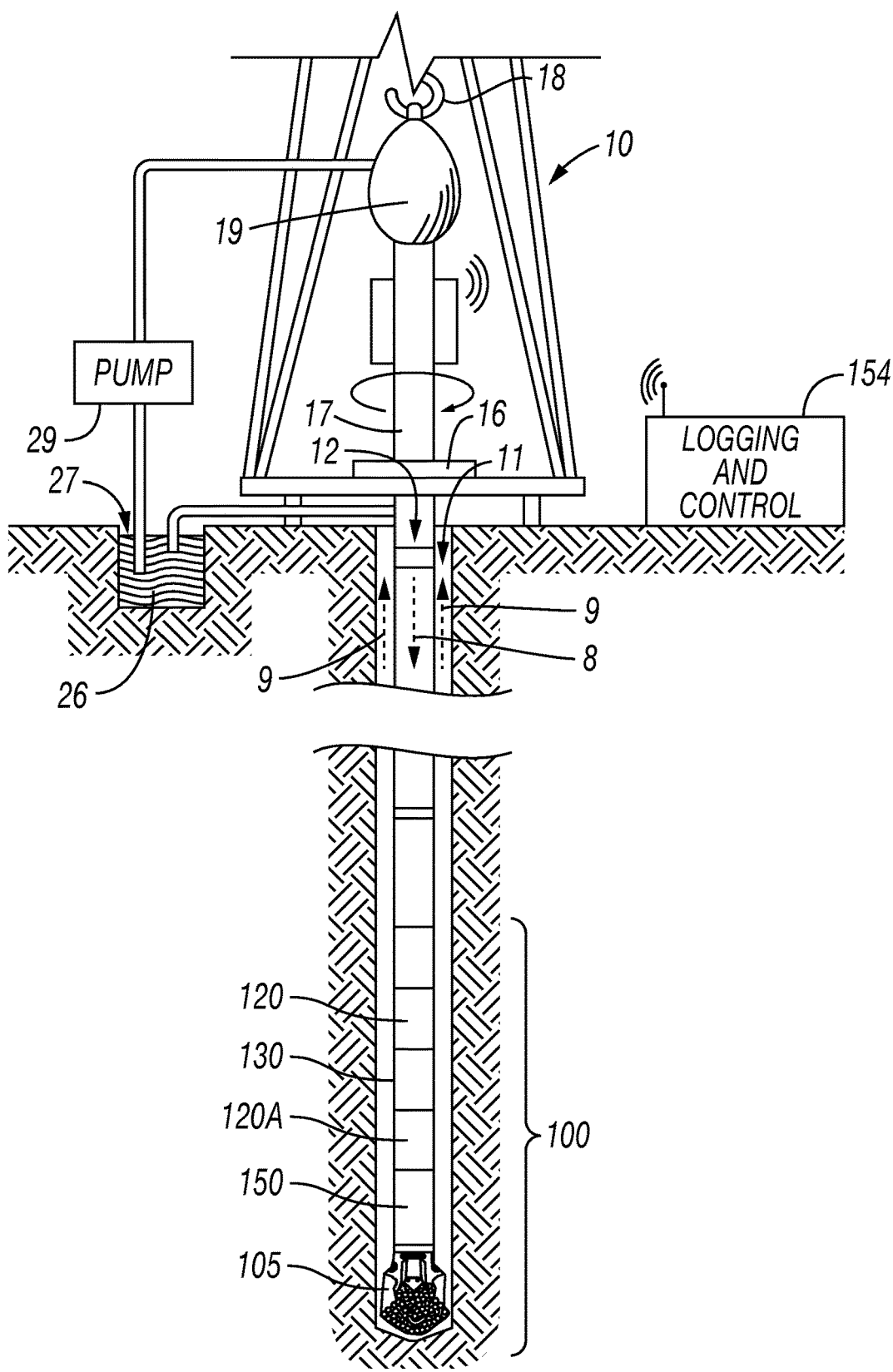
FIG. 1 shows an example wellbore drilling and LWD/WMD system that may be used in some embodiments.

FIG. 1 shows a simplified schematic view of a wellbore drilling system in which various embodiments according to the present disclosure may be used. The wellbore drilling system shown in FIG. 1 may be deployed either on land or offshore. In the described drilling system, a wellbore 11 may be formed in subsurface formations by rotary drilling in a manner that is well known to those skilled in the art. Some embodiments can also use directional drilling.

A drill string 12 is suspended within the borehole 11 and has a bottom hole assembly (BHA) 100 which includes a drill bit 105 at its lower end. A surface system includes a platform and derrick assembly 10 positioned over the wellbore 11, with the platform and derrick assembly 10 including a rotary table 16, kelly 17, hook 18 and rotary swivel 19. In a drilling operation, a drill string 12 is rotated by the rotary table 16 (energized by means not shown), which engages the kelly 17 at the upper end of the drill string 12. The drill string 12 is suspended from a hook 18, attached to a traveling block (also not shown), through the kelly 17 and a rotary swivel 19 which permits rotation of the drill string 12 relative to the hook 18. As is well known, a top drive system could be used in other embodiments of a drilling system instead of the kelly, rotary swivel and rotary table.

Drilling fluid ("mud") 26 may be stored in a pit 27 formed at the well site or a tank. A pump 29 moves the drilling fluid 26 to the interior of the drill string 12 via a port in the swivel 19, which causes the drilling fluid 26 to flow downwardly through the drill string 12, as indicated by the directional arrow 8 in FIG. 1. The drilling fluid 26 exits the drill string 12 via ports (not shown separately) in the drill bit 105, and then circulates upwardly through the annulus region between the outside of the drill string 12 and the wall of the borehole, as indicated by the directional arrows 9. In this known manner, the drilling fluid lubricates the drill bit 105 and carries formation cuttings up to the surface as it is returned to the pit 27 for recirculation.

The drill string 12 includes a bottom hole assembly (BHA) 100 which in an example embodiment may comprise one MWD module 130 and multiple LWD modules 120 (with reference number 120A depicting a second LWD module). As used herein, the term "module" as applied to MWD and LWD devices may be understood to mean either a single instrument or a suite of multiple instruments contained in a single modular device. Additionally, the BHA 100 includes the drill bit 105 and a steering mechanism 150, such as rotary steerable system (RSS), a motor, or both.

The LWD modules 120 may be disposed in a drill collar or in respective drill collars and may include one or more types of well logging instruments. The LWD modules 120 may include devices for measuring, processing, and storing information, as well as for communicating with surface equipment. By way of example, the LWD module 120 may include, without limitation, a nuclear magnetic resonance (NMR) logging tool, an electromagnetic induction and/or electromagnetic propagation resistivity tool, a nuclear tool (e.g., gamma-ray), a laterolog resistivity tool, a photoelectric factor tool, a neutron hydrogen index tool, a neutron capture cross-section tool and/or a formation density tool. The LWD module 120, in general, may include any type of logging tool suitable for acquiring measurements that may be processed to generate wellbore images.

The MWD module 130 may also be housed in a drill collar, and can contain one or more devices for measuring characteristics of the drill string and drill bit. In the present embodiment, the MWD module 130 may include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a direction and inclination package).

The MWD tool 130 may also include a telemetry apparatus (not shown).

The MWD tool 130 may also include an apparatus (not shown) for generating electrical power for the MWD tool and the LWD tool(s). In some embodiments, such apparatus may include a turbine generator powered by the flow of the drilling fluid 26. It is understood, however, that other power and/or battery systems may be used.

The operation of the platform and derrick assembly 10 of FIG. 1 as well as the LWD modules 120, 120A and MWD module 130 may be controlled using a control system 154. In one embodiment, the control system 154 includes a surface control system for controlling the operation of the platform and derrick assembly 10, the LWD modules 120 and 120A and the MWD module 130. Alternatively, control can be split with the platform and derrick assembly 10 controlled by a surface control system and some or all of the LWD modules 120, 120A and MWD module 130 controlled using a control system located in the BHA 100. Communication between the surface control system and the controls system located in the BHA 100 can be effected by telemetry systems, such as a telemetry system in the MWD 130 communicating with the surface. The control system 154 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for example, processes for carrying out a drilling operation, algorithms and routines for processing data received at the surface from the BHA 100 (e.g., as part of an inversion to obtain one or more desired formation parameters), and the like.

While the example wellsite system shown in FIG. 1 illustrates a basic logging-while-drilling system, it will be appreciated by those skilled in the art that the methods disclosed herein are also applicable to borehole images acquired using wireline tools deployed by a wireline (e.g., armored electrical cable). Because the LWD modules 120, 120A and MWD module 130 shown in FIG. 1 may be rotated during drilling of the wellbore 11, measurements made by the various sensors therein may be substantially azimuthally or circumferentially continuous. While certain types of wireline images may not be azimuthally continuous, a suitable "in-painting" (interpolation) algorithm may be used in wireline embodiments to make wellbore images be substantially azimuthally or circumferentially continuous such that the presently disclosed methods are applicable thereto.

As described above, embodiments according to the present disclosure relate to systems and methods for automatic interpretation of structural features observed in wellbore images made from well logging measurements acquired in a wellbore penetrating subterranean formations. In particular, the methods disclosed herein for automatic structural interpretation are applicable to, but are not limited to high-angle and horizontal wells. Other methods are disclosed in International (PCT) Application Publication No. WO2013/066682, filed on Oct. 24, 2012 and entitled "Inversion-Based Workflow for Processing Nuclear Density Measurements In High-Angle and Horizontal Wells."

Figure 2:
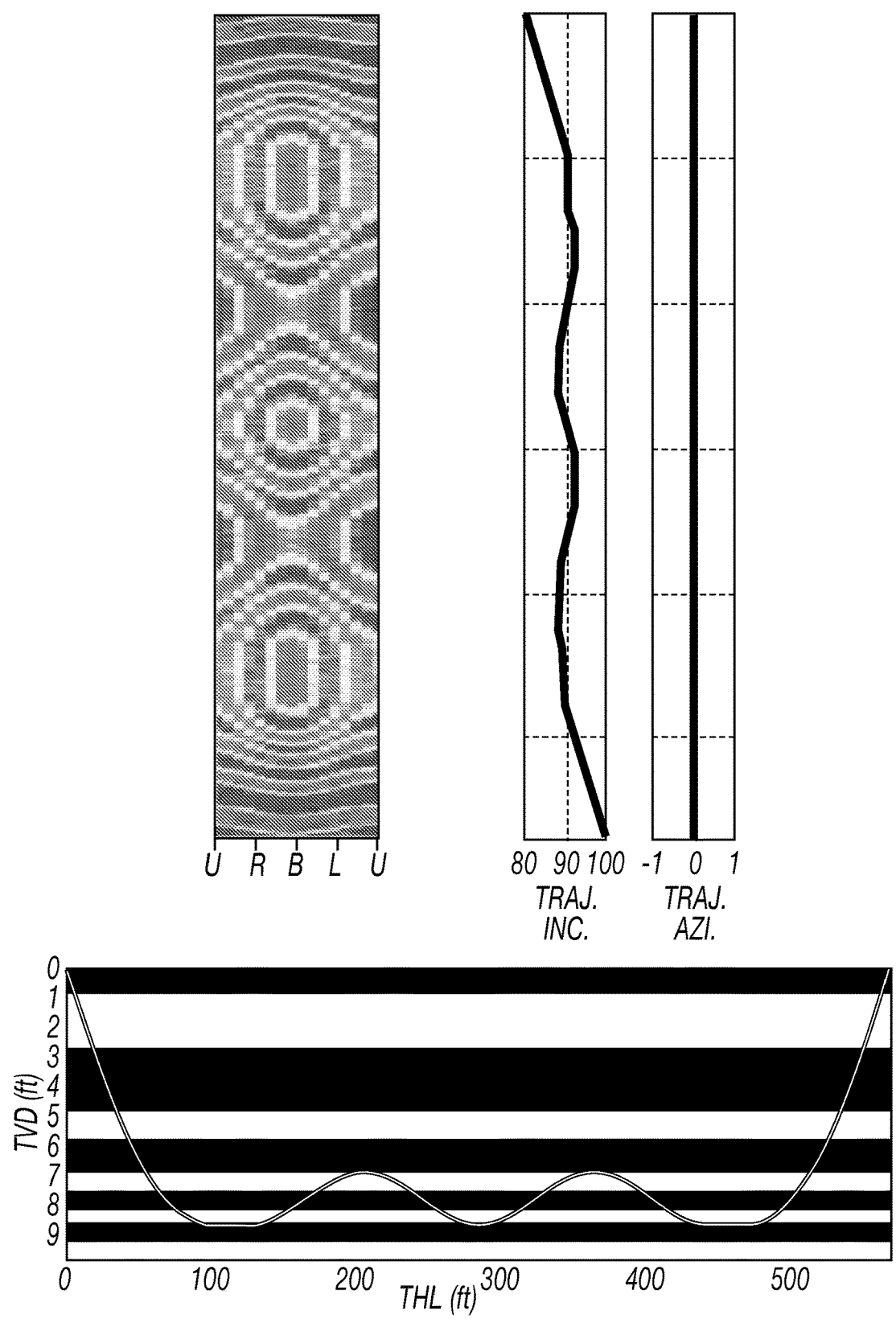
FIG. 2 shows an example of topology of structural features observed in LWD images. The tracks show well azimuth, well inclination, simulated density image, and curtain section formation model.

By way of background information, FIG. 2 illustrates the topology of various structural features that may be observed in images acquired in horizontal or high-angle (highly inclined) wells. The example in FIG. 2 is intended to represent images acquired using a LWD tool. The tracks in FIG. 2 represent, from top to bottom, measured well azimuth, measured well inclination, a simulated density image (which may be plotted in color scale or gray scale corresponding to density measurement values), and a curtain section formation model. As explained above, methods used to generate images such as shown in FIG. 2 may also be used with images acquired using wireline tools (provided that they are processed to be azimuthally substantially continuous, as explained above). Thus, when the term "LWD image" is used in the present disclosure, it should be understood that this term is intended to mean that the image is azimuthally substantially continuous, though such images could be acquired using LWD tools or wireline tools, as previously explained.

From three dimensional (3D) geometry, it can be shown that when a centralized (disposed coaxially in a wellbore) well logging instrument crosses a planar formation layer boundary having substantially constant inclination and substantially constant azimuth, an image generated from the well logging measurements may be characterized by a feature whose shape is described by a simple sinusoid:

$$l(\Theta) = l_0 + (r_{bh} + EPL)(\tan \beta_r \cos \Theta + \tan \beta_r \tan \alpha_a \sin \Theta), \quad (1)$$

$$\tan \alpha_a = \sin(\beta_t - \beta_r)\tan(\alpha_t - \alpha)/\sin \beta_r, \quad (2)$$

$$\tan(\beta_t - \beta_r) = \tan \beta \cos(\alpha_t - \alpha), \quad (3)$$

where $\Theta$ is the tool sensor azimuth, $\beta_r$ is apparent relative dip (the angle between the tool axis and a line normal to the formation layer boundary, measured at the well azimuth), $\alpha_a$ is apparent relative azimuth, $\alpha_t$ is well azimuth, $\beta_t$ is well inclination, $\beta$ is true layer dip, $\alpha$ is true layer azimuth, $r_{bh}$ is the borehole radius, and EPL is the so-called "effective penetration length" of the well logging tool. It is noted that the EPL reflects the fact that the tool measures properties of the formation within a finite volume-of-investigation that extends laterally into the formation beyond the wellbore wall. The variables and their symbols are summarized below in Table 1.

TABLE 1

Summary of parameters and symbols for geometric model of sinusoidal features

| Parameter | Symbol |
|---|---|
| Tool sensor azimuth | $\Theta$ |
| True layer dip | $\beta$ |
| True layer azimuth | $\alpha$ |
| Well inclination | $\beta_t$ |
| Well azimuth | $\alpha_t$ |
| Apparent relative dip | $\beta_r$ |
| Apparent relative azimuth | $\alpha_a$ |

The shape of a feature in an image generated from well logging measurements will differ from a simple sinusoid if the relative formation dip varies as the well logging tool crosses the layer boundary, for example, due to variations of formation layer dip or well trajectory. Because the image sinusoid amplitude is proportional to tan $\beta_r$, departures from simple sinusoidal shapes are more likely to occur when the local relative dip $\beta_r$ approaches 90°, i.e., when the wellbore trajectory is close to parallel to the layer boundary. An example of a non-sinusoidal feature is often referred to as a "bulls-eye" feature. Bulls-eye features may appear during near-parallel drilling when the relative dip changes polarity from down-section ($\beta_r < 90°$) to up-section ($\beta_r > 90°$). A bulls-eye feature is shown in the density image track in FIG. 2, for example. Further, reverse bulls-eye features may appear in the opposite case, when drilling near-parallel from up-section to down-section. When a wellbore is drilled parallel to a nearby layer boundary over an extended axial (measured depth) interval without change in polarity, the image may characterized by parallel stripes that are often referred to as "railroad tracks." As will be appreciated by those skilled in the art, a well logging instrument or sensor that makes measurements corresponding to formation density may include the capability of measuring formation photoelectric effect. Such capability may be provided by using a source of gamma rays to energize the formation and measuring numbers of backscattered gamma rays from the formation as well as photons having energy corresponding to the photoelectric factor of the subsurface formation.

In accordance with embodiments according to the present disclosure, a process for structural interpretation of sinusoidal and bulls-eye features observed in LWD images is set forth below. The process may include at least the actions described below as applied to a "noisy" synthetic density image, shown in FIGS. 3 and 4. The details of each act in example processes are set forth below. Additionally, FIGS. 5-11 show examples of how the acts described may be applied to various LWD images acquired from within a wellbore on different types of structural features (e.g., sinusoidal, bulls-eye, reverse bulls-eye).

1. Contour Extraction

Figure 3:
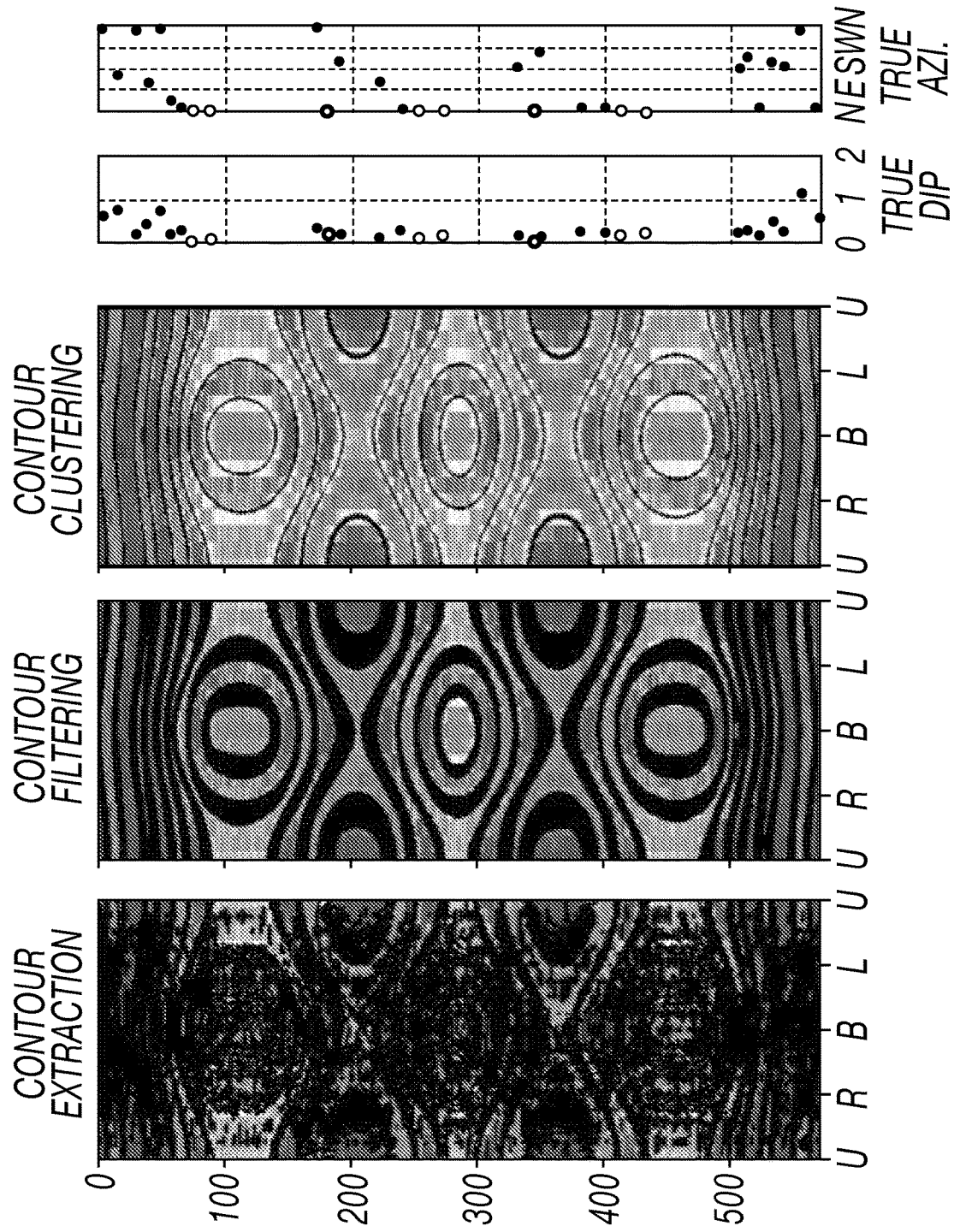
FIG. 3 shows an overview of workflow for automatic structural interpretation of logging-while-drilling images.
Figure 4:
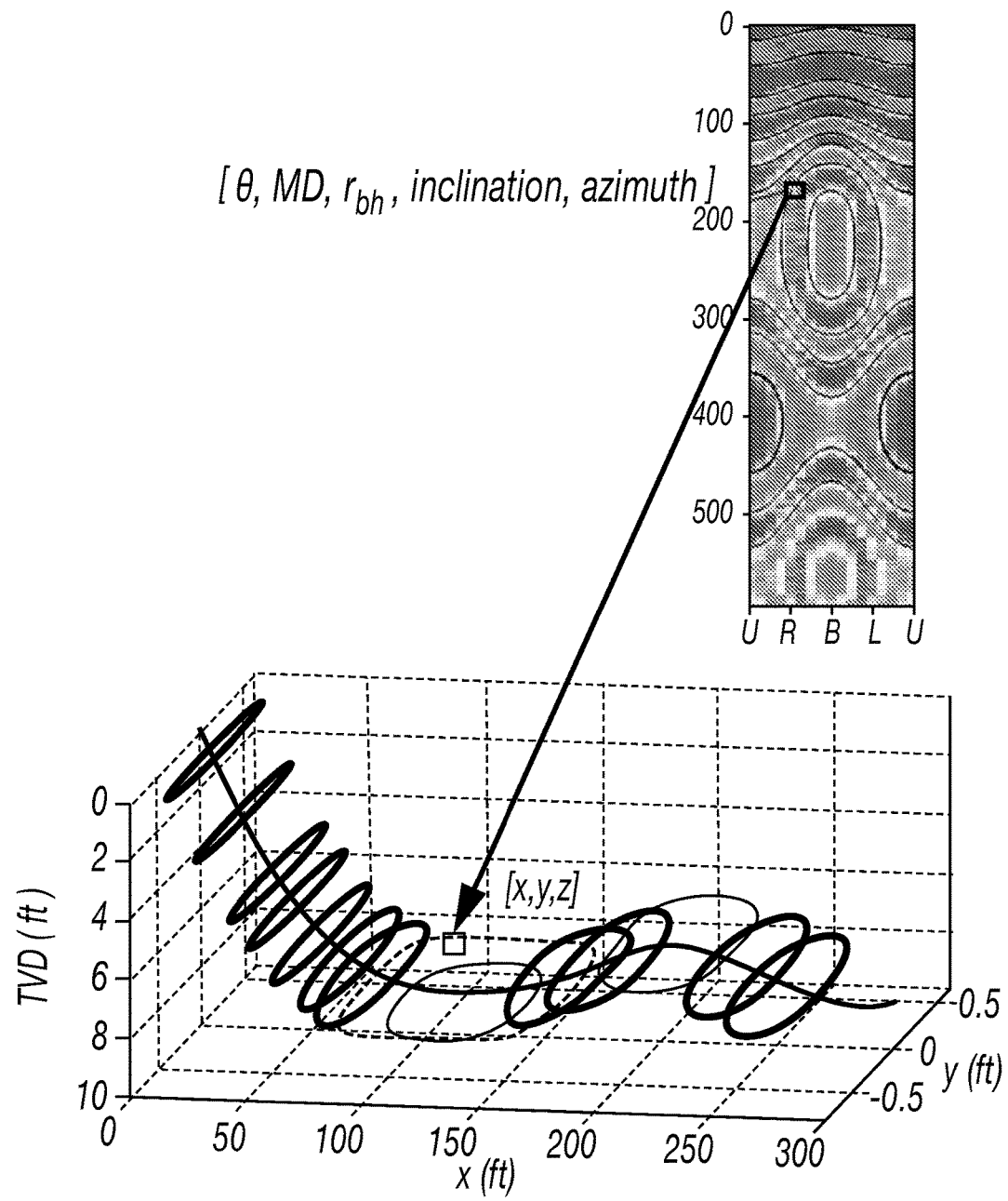
FIG. 4 shows an example plot from step 4 of the workflow (Contour Projection and Dip Estimation), wherein contours are mapped to three-dimensional point clouds, and true dip and true azimuth of a planar feature are estimated by fitting a plane to a point cloud.

As may be observed in FIG. 3, an LWD image may be characterized by nearly piece-wise constant regions whose boundaries are demarcated by a thin transition zone where the image pixel values transition between the pixel values of adjacent regions. In contour extraction, boundary information for each piece-wise constant region is extracted by computing contours of the image with the expectation that contours will generally tend to cluster within transition zones.

Generally, contours that are either open or closed are computed. As the terms are used herein, an "open" contour may be generally regarded as a contour that extends from $\Theta = 0°$ to $\Theta = 360°$, where $\Theta$ is the well logging sensor azimuth, and a "closed" contour is one that forms a closed loop in the interior of the image. The image may be rotated by $\Theta = 180°$ to capture reverse bulls-eye features. As can be appreciated, contours of the image may be computed using any suitable contour extraction algorithm, such as a marching-squares algorithm (see, e.g., Lorenson et al., "*Marching Cubes: A High Resolution 3D Surface Construction Algorithm,*" SIGGRAPH '87 Proceedings of the 14th Annual Conference on Computer Graphics and Interactive Techniques, vol. 21, pp. 163-169, July 1987), square tracing algorithm, Moore-Neighbor algorithm, radial sweep algorithm, Theo Pavlidis' algorithm, asymptotic decider algorithm, cell-by-cell algorithm, or any suitable computer graphics contouring algorithm or a combination of such algorithms. Contour extraction is shown in the left hand most track in FIG. 3.

The contour extraction process may fail to detect a feature if there are very large deviations in the values of adjoining pixels of a structural feature. For example, in LWD resistivity images, the upper quadrant of the image may be excluded for the calculation of contours. The exclusion of the upper quadrant improves reliability of the contour extraction because, unlike density images, resistivity images are generally not compensated for mud standoff effects. Therefore, sinusoidal features may not be continuous across the upper quadrant of a resistivity image. Upper quadrant as used herein is intended to mean a circumferential or azimuthal segment of the wellbore wall subtending an azimuthal angle of ¼ of the full circumference (90 degrees) and being centered about the gravitationally uppermost point of the wellbore circumference. Thus the track scales for the three image tracks in FIG. 3 identify the upper quadrant "U", right hand quadrant "R", bottom quadrant "B" and left hand quadrant "L."

2. Contour Filtering

Noise in the wellbore images may lead to the extraction of a large number of spurious contours that do not correlate with the transition zone of any actual geologic feature in the image. Noise also results in extracted contours having small-scale waves and/or large meanderings away from the transition zone. In accordance with an example embodiment, the present method may use one or both of the following example filtering processes to help reduce spurious contours and contour waves.

First, it is noted that bulls-eye features generally have a minimum extent in measured depth. This can be better understood if $L_{min}$ is defined to be the characteristic length-scale over which the well inclination may vary (dogleg severity, that is, angular change in wellbore trajectory with respect to axial span, places a lower limit on the length-scale), or the length-scale over which the formation dip varies, whichever is smaller (usually the former is limiting). A bulls-eye feature having a measured depth extent (axial length along the wellbore) less than $L_{min}$ thus generally does not manifest itself in the image because both the well inclination and formation dip would be nearly constant over the length $L_{min}$.

Thus, a structural feature with length-scale smaller than $L_{min}$ must be a sinusoid, and the corresponding threshold relative dip $\beta_r^{min}$ for sinusoidal features to manifest themselves in the image would be given by $\beta_{min}=\tan^{-1}(0.5L_{min}/(r_{bh}+EPL))$. In accordance with an embodiment of the present method, any closed contour with a maximum extent in measured depth less than $L_{min}$ is considered to be not representative of an actual formation feature and may be deleted. As an example $\beta_r^{min}=88°$ is used herein.

Second, using the assumption that real geologic features have substantially smooth boundaries, the present example method may compute a low-order Fourier series approximation of each contour using, for example, least-squares minimization and delete any contours for which the quality of fit, as measured by the correlation coefficient R2, is lower than a specified threshold $R2_{min}$.

In one example, an open contour may be approximated using only the first harmonics in the tool azimuth Θ:

$$y_{open}(\Theta) = y_0 + A_1 \cos \Theta + B_1 \sin \Theta, \quad (4)$$

It can be observed from Eq. 1 that the above approximation is exact if the well logging instrument is centralized (coaxial with) in the wellbore and the relative dip is constant as the well logging instrument crosses a layer boundary. However, when the well is drilled near-parallel to a formation layer boundary, variations of well inclination or formation layer dip may perturb the shape of the contour from a simple sinusoid. To capture that behavior, if an open contour has measured depth extent greater than $L_{min}$, second harmonics may be included in the approximation.

For a closed contour, the foregoing may be approximated using the first m harmonics in the elliptical polar angle γ:

$$r_{closed}(\gamma) = r_0 + \sum_{i=1}^{m} P_i \cos i\gamma + Q_i \sin i\gamma. \quad (5)$$

For the example results presented in this disclosure, m=4 was used. Using the elliptical polar angle as the Fourier expansion variable instead of Cartesian polar angle allows more efficient approximation of closed contours that have an aspect ratio greater than unity (e.g., the aspect ratio of a closed contour is defined as its maximum measured depth extent to its maximum azimuthal extent). Closed contours observed in LWD images are often highly elongated in the measured depth (along the length of the wellbore) direction. For example, the measured depth extent (~$L_{min}$) is typically much greater than their maximum azimuthal extent (~$2\pi r_{bh}$). Contour filtering is shown in FIG. 3 in the second track.

3. Contour Clustering

In contour clustering, extracted, filtered contours may be automatically grouped into clusters such that each cluster corresponds to a single transition zone. In accordance with one example embodiment, a "log-squaring" algorithm may be used to identify locations of transition zones in a well log derived by azimuthal averaging of the pixels in the bottom quadrant of the image. Contours that are sufficiently close to a transition zone are grouped into a single cluster and their Fourier coefficients are averaged to derive a single smooth contour demarcating the boundary of a feature. Contour clustering is illustrated in the third track in FIG. 3.

4. Contour Projection and Dip Estimation

For open contours that have a measured depth extent less than $L_{min}$, based on the geometric model for sinusoidal features in the previous section, apparent relative dip $\beta_r^{est}$ and apparent azimuth $\alpha_a^{est}$ may be estimated from the amplitudes of the first harmonics in Eq. 4:

$$\tan \beta_r^{est} = A_1/(r_{bh}+EPL), \quad (6)$$

$$\tan \alpha_a^{est} = B_1/A_1 \quad (7)$$

True layer dip and azimuth may be determined from $\beta_r^{est}$ and $\alpha_a^{est}$ using the geometric model.

For closed contours and open contours that have measured depth extent greater than $L_{min}$, a two-dimensional image contour may be projected into a three-dimensional cloud point referenced in the well coordinate system. Such projection methods may include one such as described in Liu et al., *Improved Borehole Image Dip Calculation In Irregularly Shaped and Curved Boreholes in High-Angle and Horizontal Wells*, SWPLA 51st Annual Logging Symposium, Jun. 19-23, 2010. The projections take into account the well inclination, azimuth, and borehole geometry along the contour. In accordance with the presently described techniques, true dip and true azimuth of a feature may be estimated by least-squares fitting a plane to the 3D point cloud. The residual of the fit may be used to identify non-planar features. Further, open contours having measured depth extent less than $L_{min}$ can also be evaluated using the above-mentioned projection technique, which may simplify the computations/logic and also avoid the intermediate computations of Eqs. 6 and 7. Estimation of layer dip and azimuth using the foregoing process elements is shown in FIG. 3 in the right hand track and graphically in FIG. 4.

Figure 12:
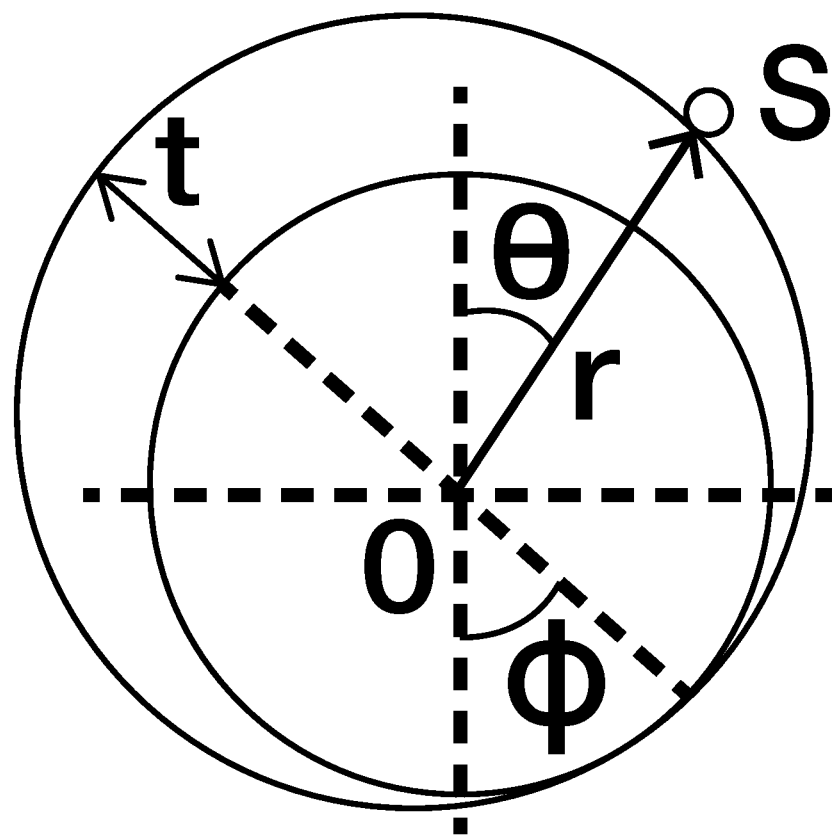
FIG. 12 is a schematic illustration showing a definition of eccentering parameters. The azimuth of the instrument sensor, and the instrument touching angle, are denoted by $\Theta$ and $\varphi$ respectively. The eccentering parameter e is defined as $e \equiv (r_{bh} - r_{tool})/r_{bh}$, where $r_{bh}$ is the radius of the cylindrical borehole and $r_{tool}$ is the instrument radius. An equivalent definition is $e \equiv t/(2r_{tool}+t)$, where t is the maximum standoff.

5. Effect of Tool Eccentering on Accuracy of Dip Estimated from Sinusoidal Features As explained above, in developing the methods disclosed herein, the effect of tool eccentering (that is, displacement of the instrument axis from the wellbore axis) on the accuracy of dip estimation was studied. For an eccentered tool, a model for the wellbore shape may be obtained by replacing the constant borehole radius $r_{bh}$ in Eq. 1 with the variable $r(\Theta)$:

$$l(\Theta) = l_0 + (r(\Theta) + EPL)(\tan \beta_r \cos \Theta + \tan \beta_r \tan \alpha_a \sin \Theta), \quad (8)$$

$$r(\Theta) = r_{bh}(e \cos(\Theta - \varphi) + \sqrt{1 - e^2 \sin^2(\Theta - \varphi)}), \quad (9)$$

$$e \equiv (r_{bh} - r_{tool})/r_{bh} \cdot t/(2r_{tool} + t), \quad (10)$$

where $r_{tool}$ is the well logging tool radius, $\varphi$ is the touching angle, t is the maximum standoff, and e is the tool eccentering. The eccentering geometry and definitions of the foregoing parameters are shown in FIG. 12.

Figure 13:
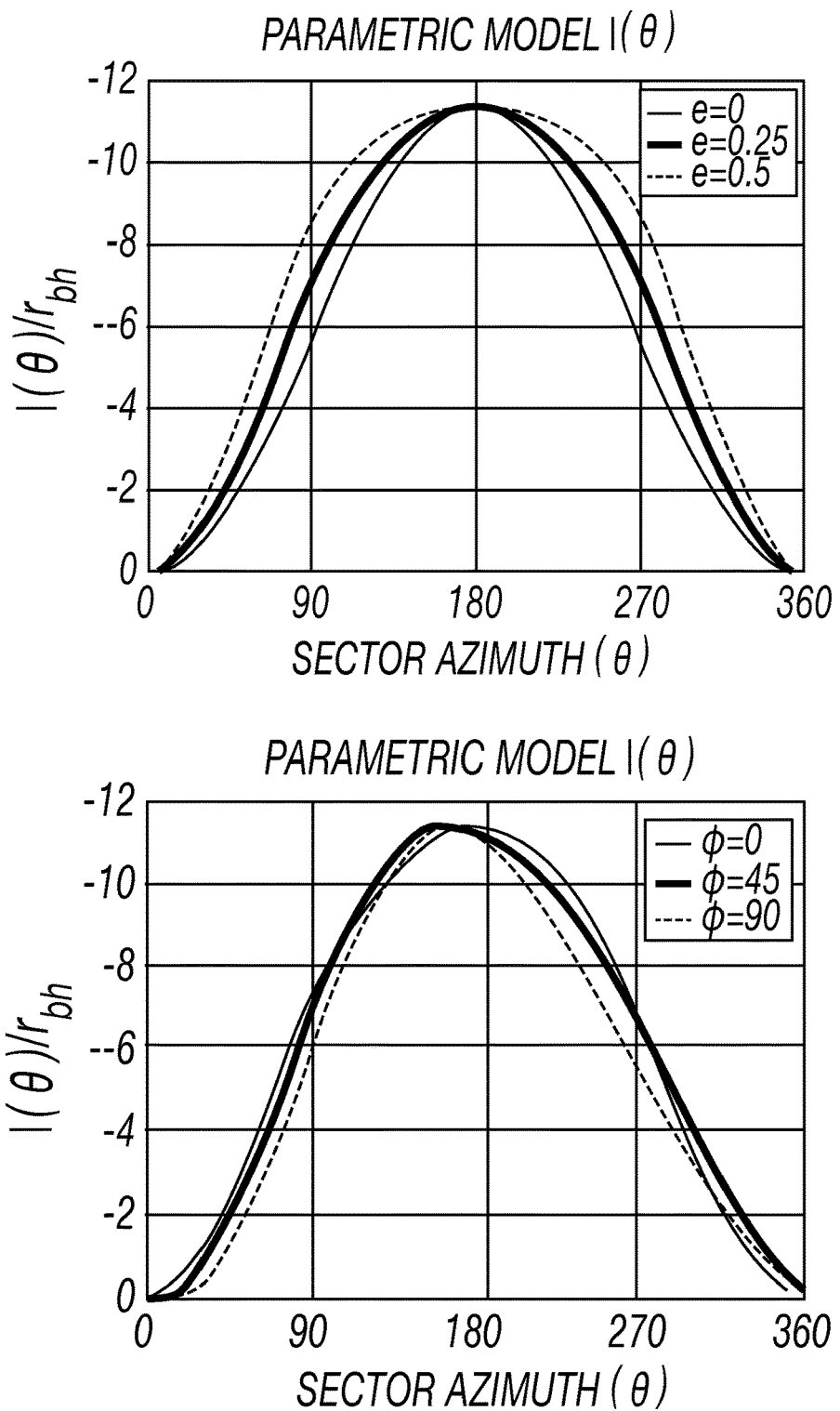
FIG. 13 shows graphically the effect of varying eccentering e and touching angle $\varphi$ on the parametric model $l(\Theta)$ given by Eq. 8. In practice, an eccentering e=0.25 may be unrealistically large. For example, for an 8.25 inch diameter tool, e=0.25 corresponds to a maximum standoff of t=2.75 inch, which is much larger than the typical standoff observed in practice.

FIG. 13 shows the effect of varying the eccentering parameters on the shape of the curve $l(\Theta)$. In the present example, the eccentering e is varied from 0.0 to 0.5, and the touching angle $\varphi$ is varied from 0° to 90°. For e=0, the curve reduces to a simple sinusoid. Further, it has been observed that increasing the eccentering e broadens the curve without noticeably changing its phase or amplitude, while varying the touching angle $\varphi$ shifts the phase of the curve. For a physical interpretation of the results, note that for an 8.25 inch diameter tool, an eccentering e=0.25 corresponds to a maximum standoff t=2.75 inch (using Equation 10), which is much larger than typical standoff observed in practice. Therefore, it is concluded that changes in curve shape caused by eccentering are generally unlikely to be discernible in field images.

As described above, example methods for estimating dip from a sinusoidal feature includes extracting a contour from the image that traces the shape of the feature, and estimating apparent relative dip $\beta_r^{est}$ and apparent azimuth $\alpha_a^{est}$ from the amplitude of the first harmonics of the contour using, for example, Equations 6 and 7. However, assuming that the contour is in reality described by the curve $l(\Theta)$ in Equation 8, the parameters $\beta_r^{est}$ and $\alpha_a^{est}$ would be accurate when e=0, and would be erroneous if the tool were eccentered. To understand the behavior of the error, one may use the fact that e<1 to expand 40) as a power series of e:

$$r(\Theta) = r_{bh}\left(1 + e\cos\Theta - \frac{e^2}{2}\sin^2\Theta + \ldots\right) \quad (11)$$

where for convenience of analysis, it is assumed that the touching angle $\varphi$ is zero.

Substituting the above expression for 40) in Eq. 8, multiplying out the various terms and expressing as a Fourier series in terms of angle $\theta$ results in the expression:

$$l(\Theta) = \gamma_0 + \hat{A}_1 \cos \Theta + \hat{B}_1 \sin \Theta + \hat{A}_2 \cos 2\Theta + \ldots \quad (12)$$

where the amplitude $\hat{A}_1$ and $\hat{B}_1$ of the first harmonics are:

$$\hat{A}_1 \sim (r_{bh}(1 - e^2/4) + EPL)\tan \beta_r, \quad (13)$$

$$\hat{B}_1 \sim (r_{bh}(1 - 3e^2/4) + EPL)\tan \alpha_a \tan \beta_r. \quad (14)$$

When comparing Eqs. 13-14 with Eqs. 6-7, it can be observed that errors in the estimated relative dip and apparent azimuth have a relatively weak, second-order dependence on tool eccentering e.

Figure 14:
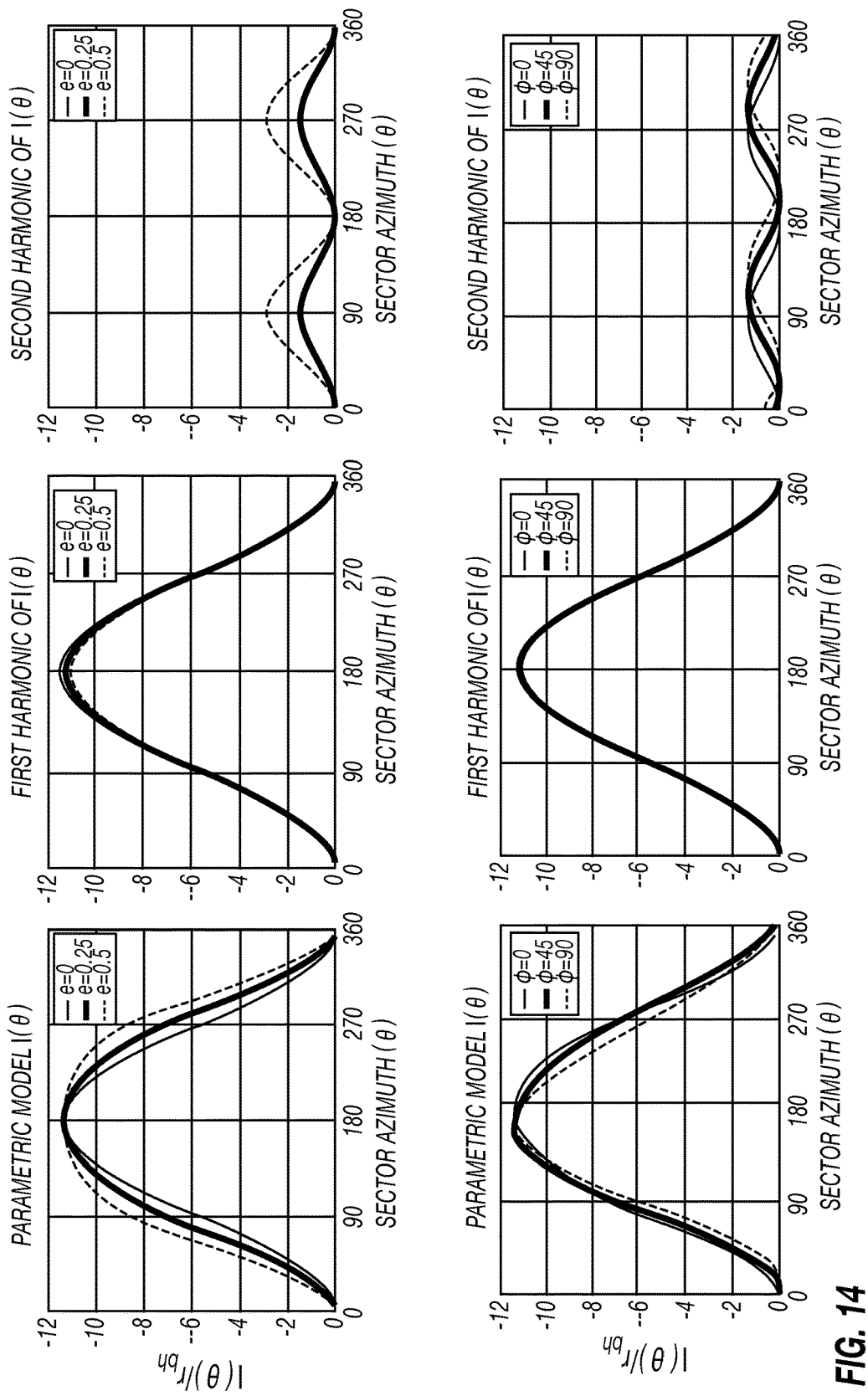
FIG. 14: graphically shows sensitivity of first and second harmonics of the parametric model $l(\Theta)$ given by Eq. 8 to changes in the eccentering e (top row), and changes in the touching angle $\varphi$ (bottom row). The first harmonic shows weak sensitivity to e or (p, while most of the sensitivity appears in the second harmonic. Thus relative dip and apparent azimuth estimated from the first harmonic (see Eqs. 6-7), as in the workflow, should be relatively insensitive to eccentering.
Figure 15:
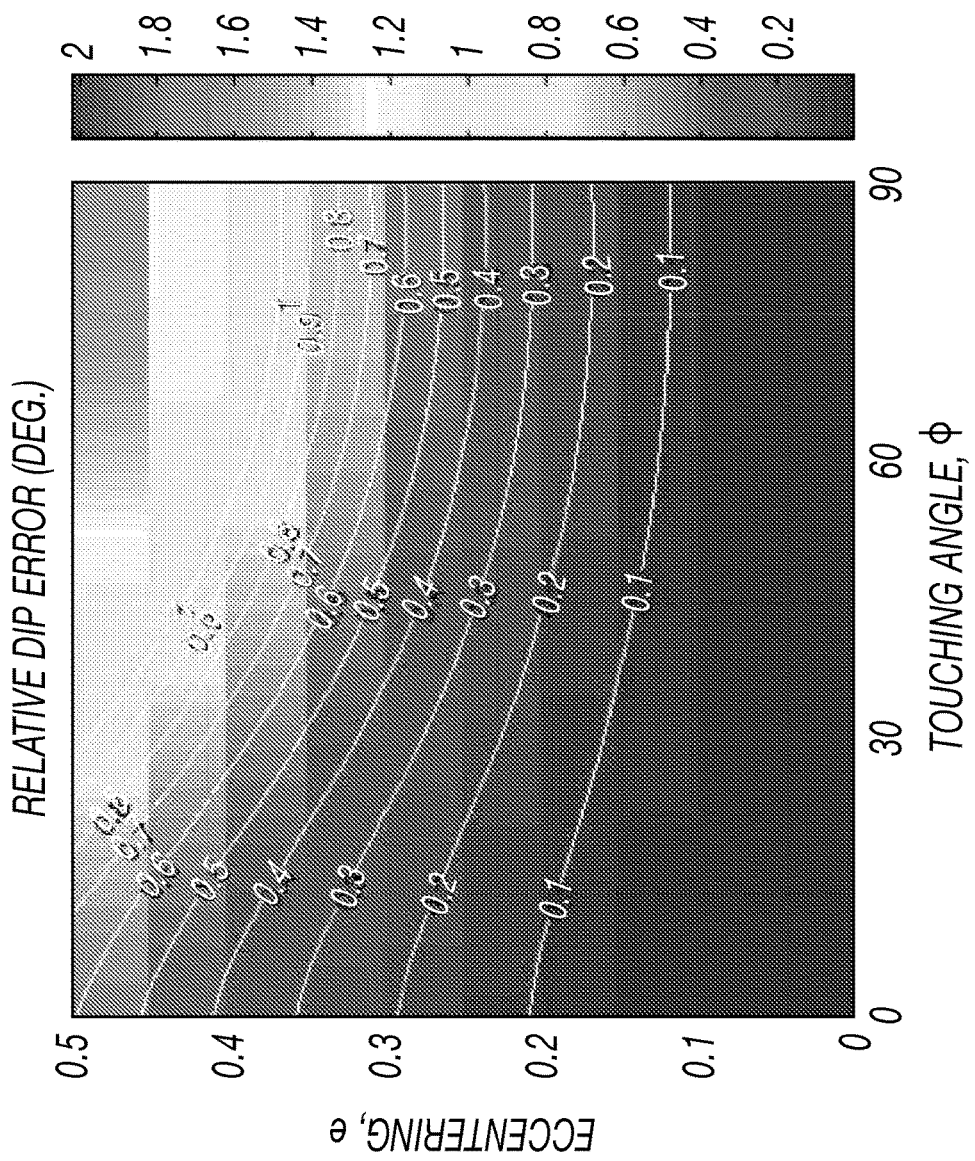
FIG. 15 shows error in estimated relative dip $\beta_r^{est}$ resulting from applying Eq. 6 to a contour $l(\Theta)$ given by Eq. 8, for different values of eccentering e and touching angle $\varphi$. The error is defined as $|\beta_r^{est} - \beta_r|$, and each pixel shows a worst error over the range $70° < \beta_r < 90°$, and $-10° < \alpha_a < 10°$.
Figure 16:
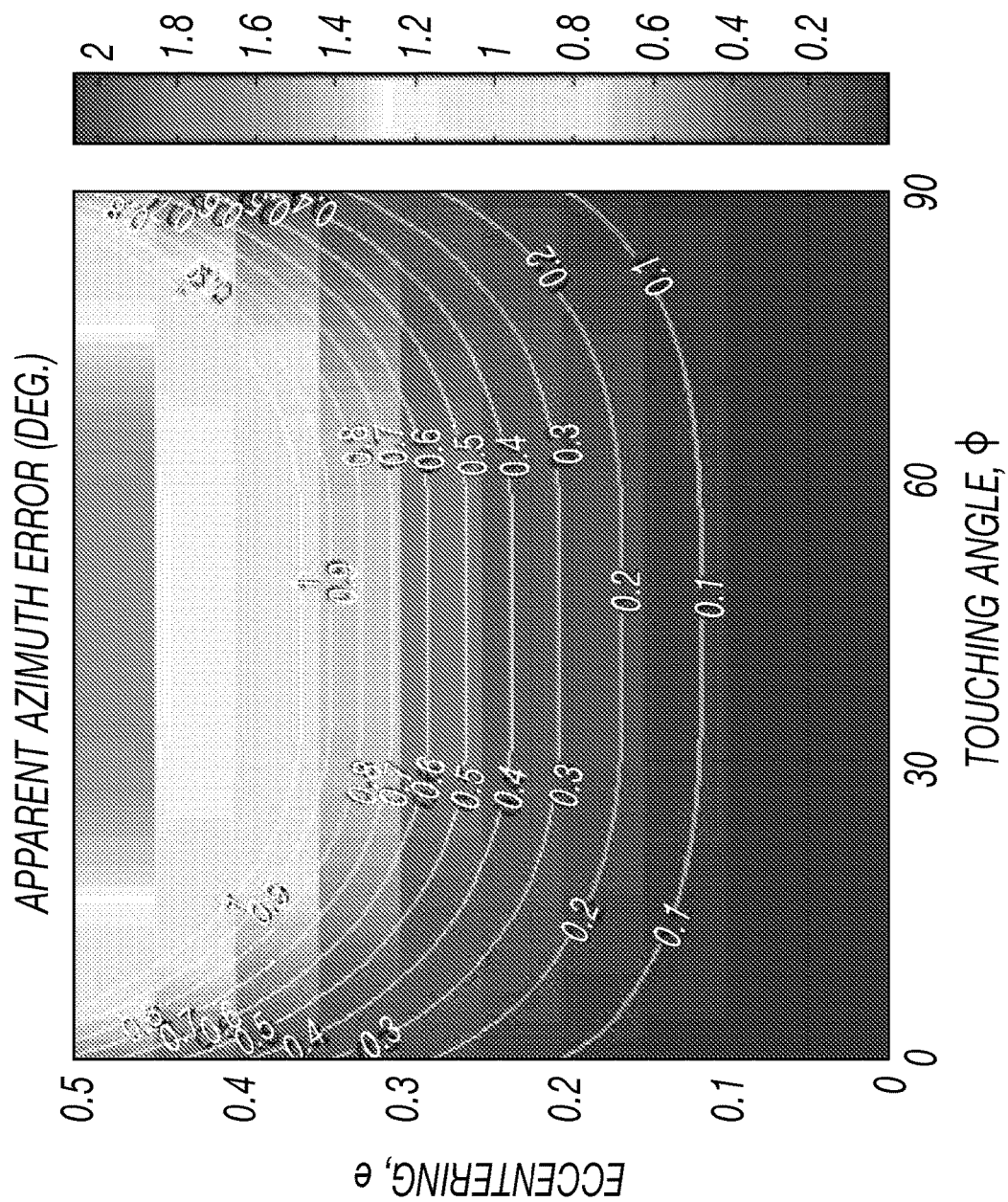
FIG. 16 shows the error in estimated apparent azimuth resulting from applying Eq. 7 to a contour $l(\Theta)$ given by Eq. 8, for different values of eccentering e and touching angle $\varphi$. The error is defined as $|\alpha_a^{est} - \alpha_a|$, and each pixel shows a worst error over the range $70° < \beta_r < 90°$, and $-10° < \alpha_a < 10°$.

The above analysis may be independently validated by generating synthetic contours using Eq. 8 for different values of $[\varphi, e, \beta_r, \alpha_a]$ and extracting harmonics of $l(\Theta)$ numerically. FIG. 14 shows qualitatively the behavior of the first harmonic for different preselected values of eccentering and touching angle. Sensitivity of the first and second harmonics of the parametric model $l(\Theta)$ given by Eqn. 8 are shown with respect to changes in the eccentering e (shown in the top row in FIG. 14), and changes in the touching angle $\varphi$ (shown in the bottom row). The first harmonic shows very weak sensitivity to e or $\varphi$, while most of the sensitivity appears in the second harmonic. Thus relative dip and apparent azimuth estimated from the first harmonic (see Eqs. 6-7) should be relatively insensitive to eccentering. To quantify the error, relative dip and apparent azimuth may be estimated from the first harmonic using Eqs. 6-7, and compared with the true values. Example error plots are shown in FIGS. 15-16.

For the present example, it can be observed that the error in relative dip and apparent azimuth are both less than 0.2°, for e<0.2, 0°<$\varphi$<90°, 70°<$\beta_r$<90°, and −10°<$\alpha_r$<10°. This is a conservative bound. For example, for an 8.25 inch diameter tool, e<0.2 is equivalent to a maximum standoff t<2.1 inches, which is typically much larger than typical standoff observed in practice. FIG. 15 shows error in estimated relative dip $\beta_r^{est}$ resulting from applying Eqn. 6 to a contour $l(\Theta)$ given by Eqn. 8, for different values of eccentering e and touching angle $\varphi$. The error may be defined as $|\beta_r^{est} - \beta_r|$ and each pixel shows the worst error over the range 70°<$\beta_r$<90°, and −10°<$\alpha_a$<10°. FIG. 16 shows error in estimated apparent azimuth resulting from applying Eqn. 7 to a contour $l(\Theta)$ given by Eqn. 8, for different values of eccentering e and touching angle $\varphi$. The error is defined as $|\alpha_a^{est} - \alpha_a|$, and each pixel shows the worst error over the range 70°<$\beta_r$<90°, and −10°<$\alpha_a$<10°.

6. Results for Actual Wellbore Data

Figure 5:
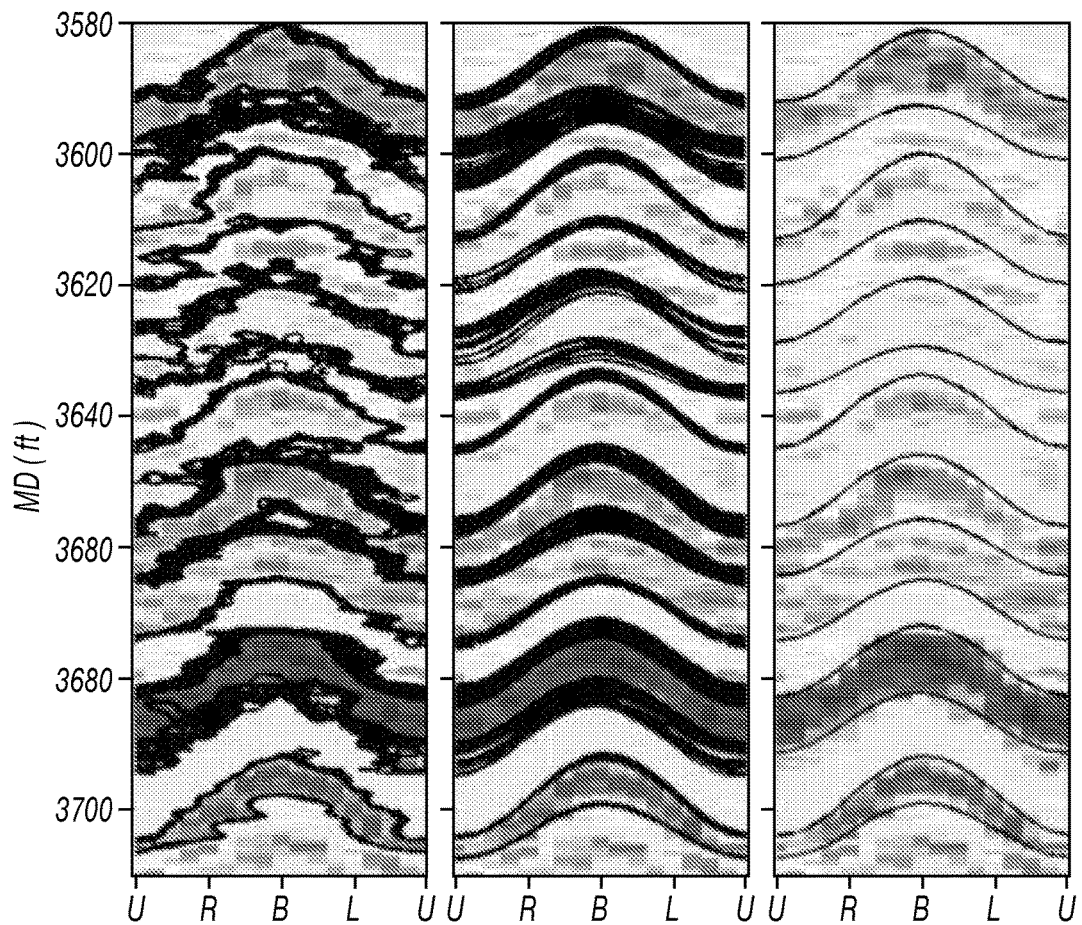
FIG. 5: shows from left to right and illustration of workflow steps 1-3 for a field density image with sinusoidal features.
Figure 6:
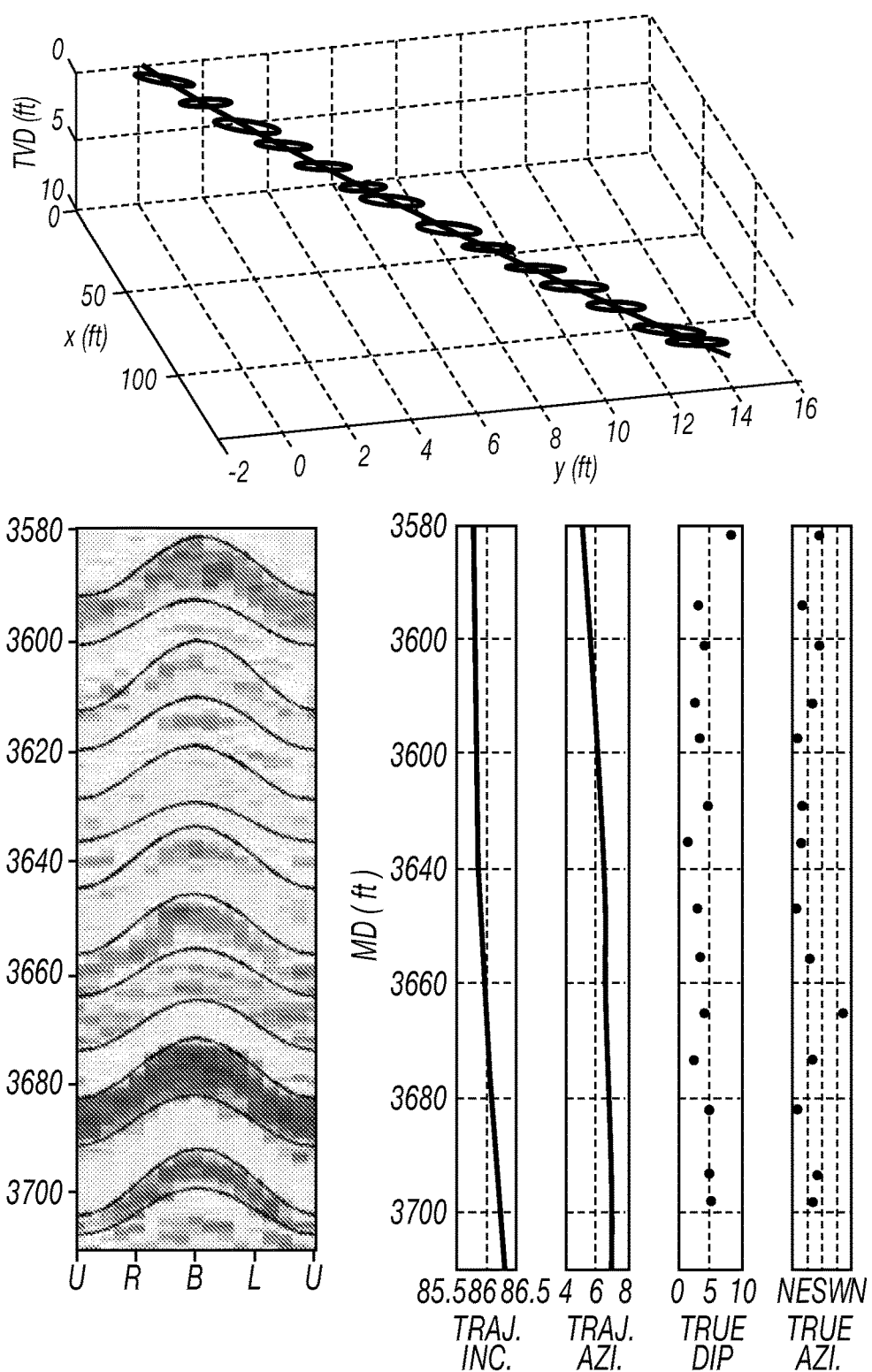
FIG. 6 shows an illustration of step 4 of the workflow for a field density image with sinusoidal features.
Figure 7:
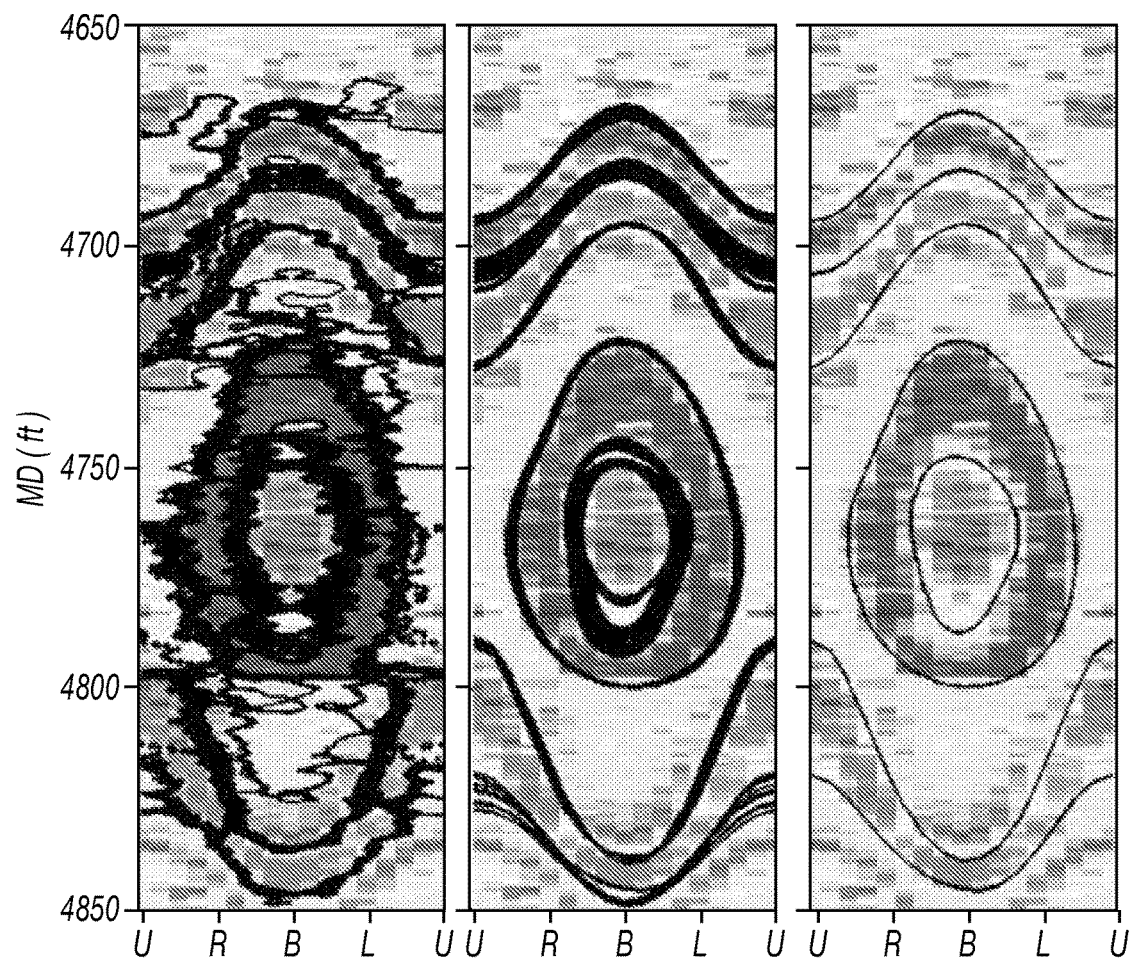
FIG. 7 shows from left to right an illustration of workflow steps 1-3 for a field density image with bulls-eye feature.
Figure 8:
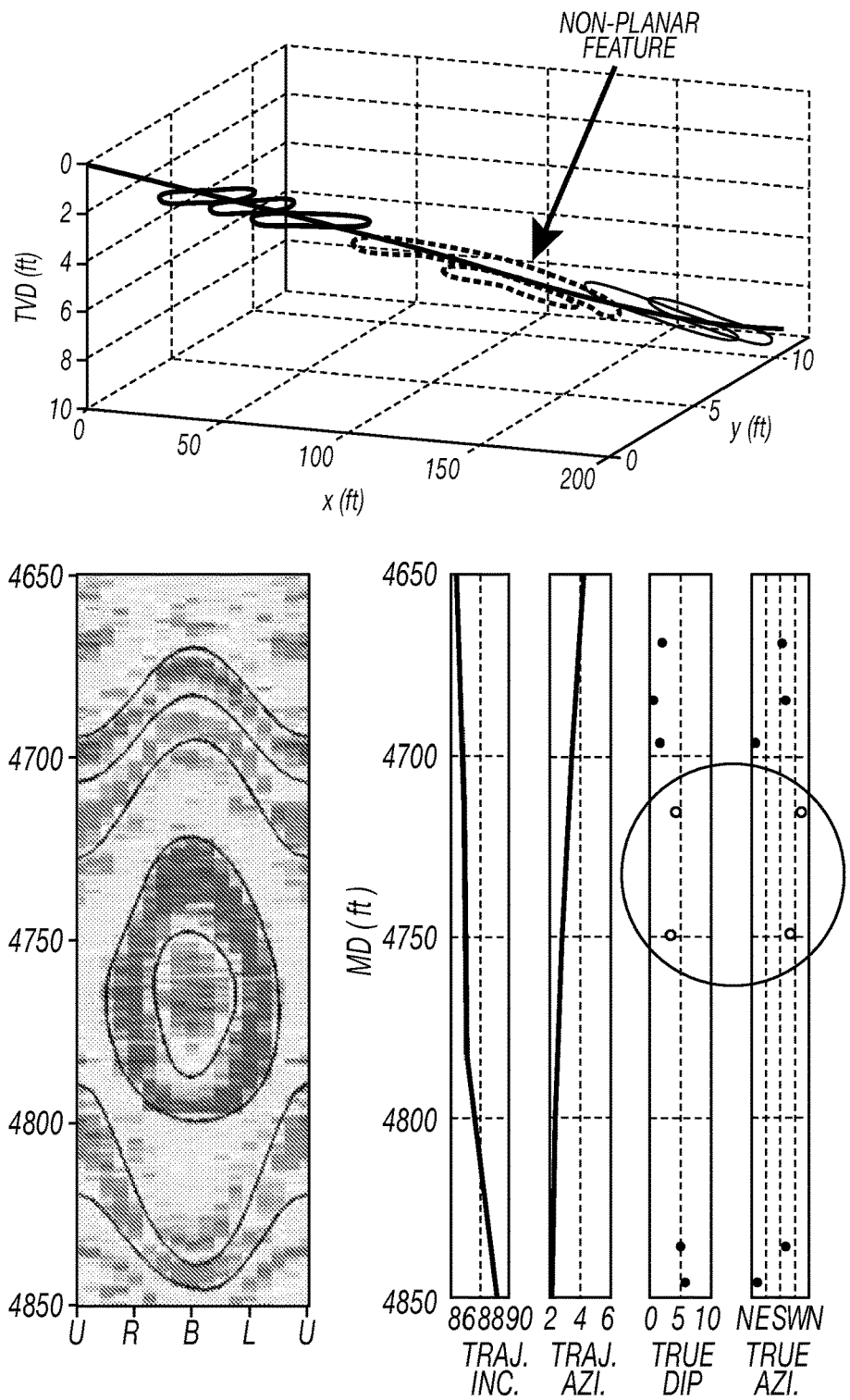
FIG. 8 shows an illustration of step 4 of the workflow for a field density image with a bulls-eye feature. The 3D projection of the bulls-eye, and the corresponding dip and azimuth are shown with the circled points on the right.
Figure 9:
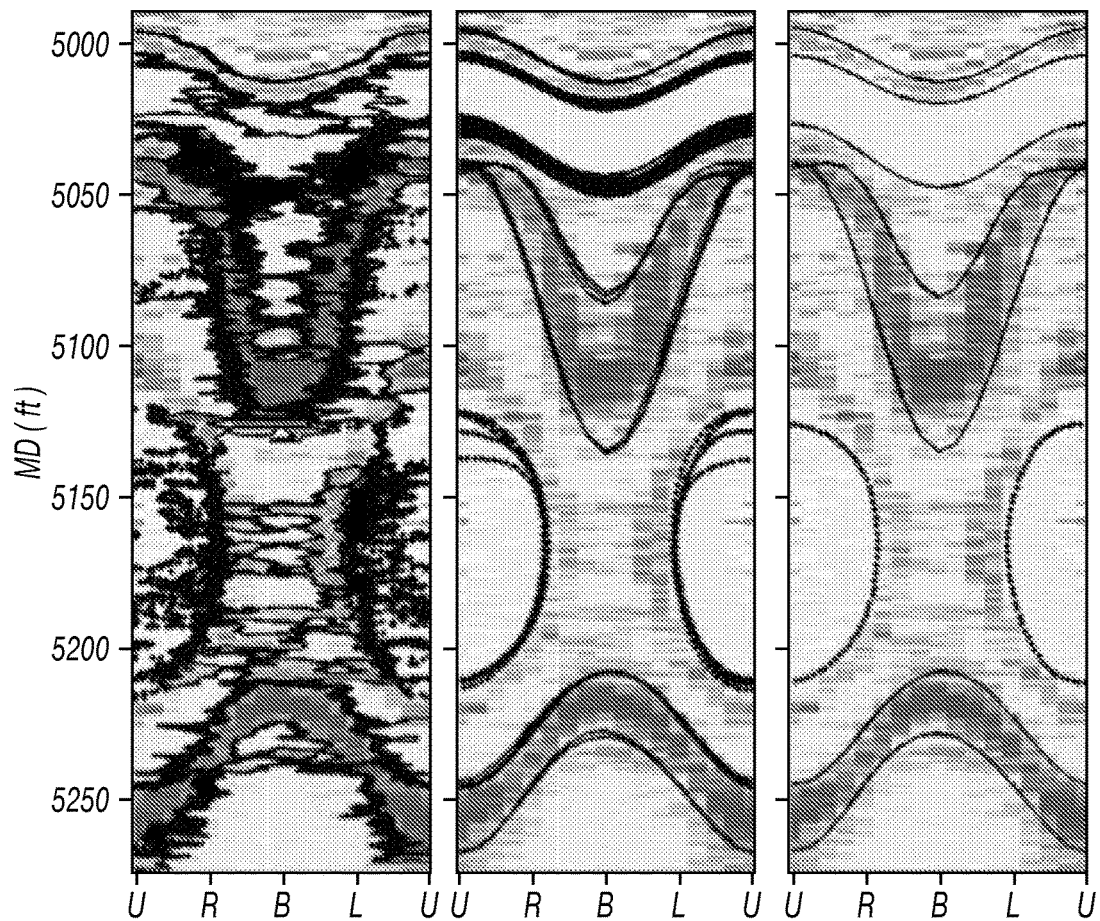
FIG. 9 shows from left to right, an illustration of workflow steps 1-3 for a field density image with a reverse bulls-eye feature.
Figure 10:
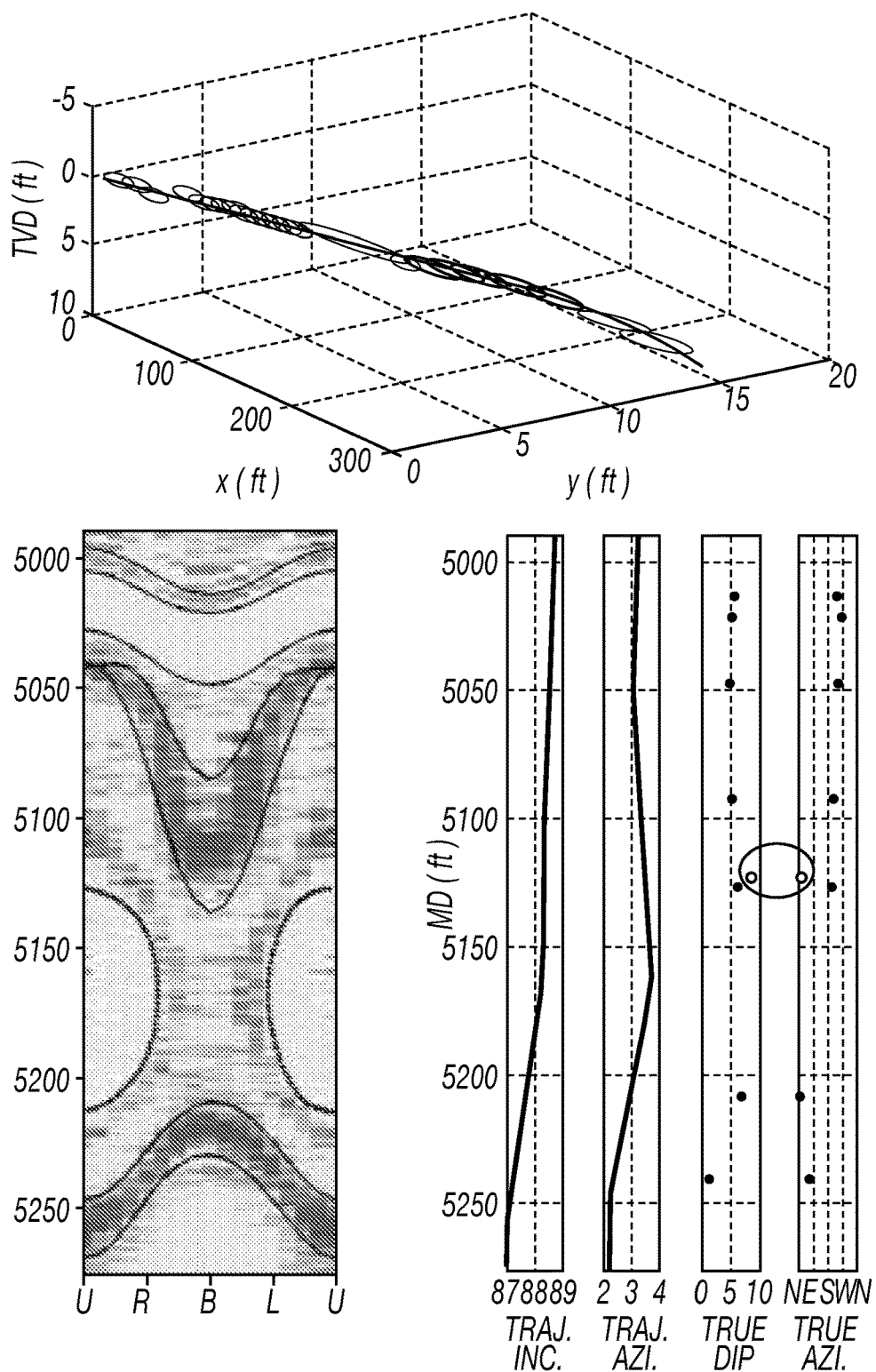
FIG. 10 shows an illustration of step 4 of the workflow for a field density image with a reverse bulls-eye feature. The 3D projection of the reverse bulls-eye feature and the corresponding dip and azimuth are shown with circled points.

FIGS. 5-6, FIGS. 7-8, and FIGS. 9-10 illustrate application of the above-described methods to LWD density images containing sinusoidal, bulls-eye, and reverse bulls-eye features, respectively. FIG. 5 shows, from left to right, illustration of contour extraction, contour filtering and contour clustering for wellbore density image with sinusoidal features. FIG. 6 shows identified contours mapped to three-dimensional point clouds, and true dip and true azimuth of a feature estimated by fitting a plane to a point cloud. FIGS. 7 and 8 show process elements as illustrated in FIGS. 5 and 6, respectively as applied to a bulls-eye feature. FIGS. 9 and 10 show process elements as illustrated in FIGS. 5 and 6, respectively, as applied to a reverse bulls-eye feature.

Figure 11:
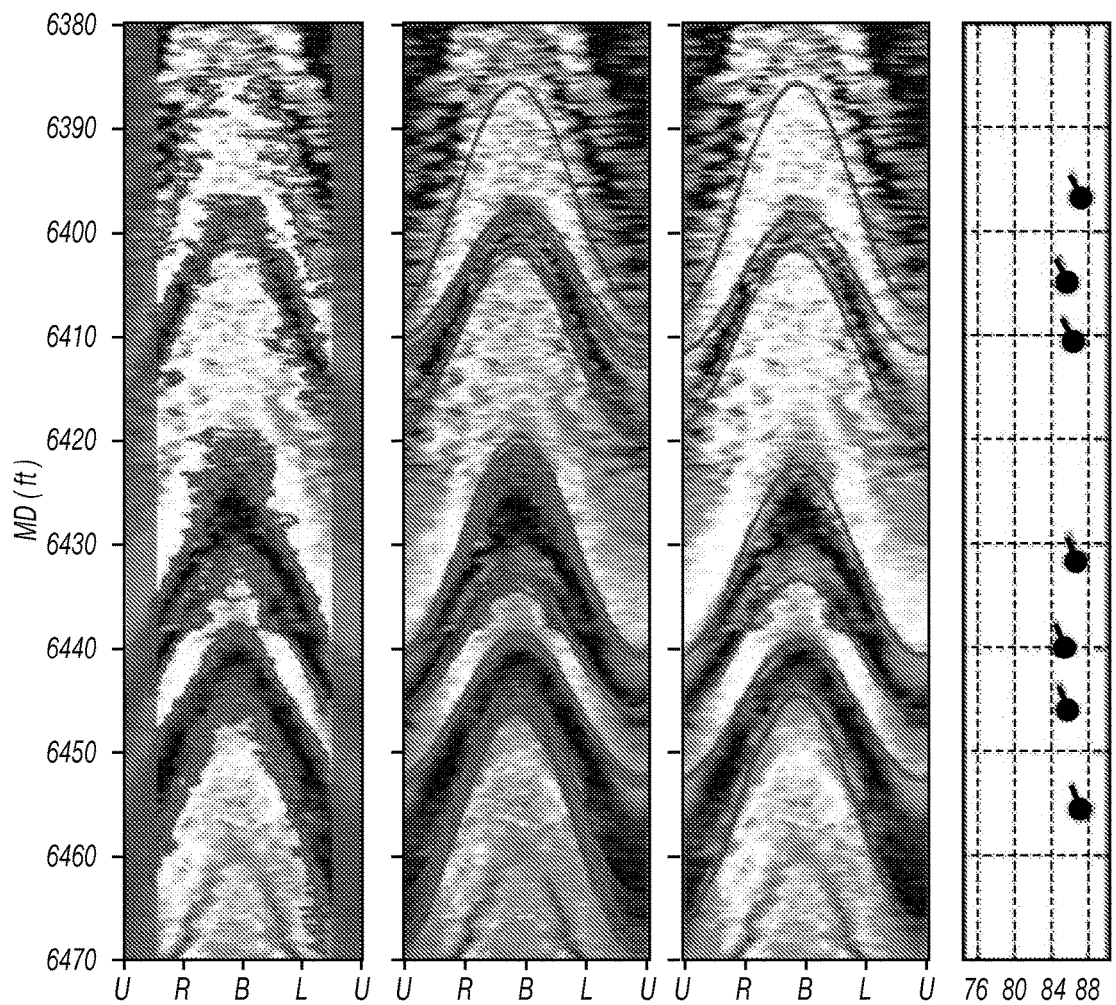
FIG. 11 shows results for a field resistivity image with sinusoidal features.

The disclosed method may enable detecting contours for structural features, which are then projected into three-dimensional space of the wellbore for characterization of formation structure. In one example, a bulls-eye feature in the image may be shown to correspond to a non-planar structure intersected by the wellbore. In practice, it has been found that the processing time is a few seconds for a hundred feet (30 meters) of measured depth of well log data, thus enabling the disclosed method to be fast and efficient when compared to certain other techniques for structural interpretation of wellbore image data. A summary of the input parameters and their values for the results are set forth in Table 2. FIG. 11 shows the results of applying the disclosed process to an actual wellbore resistivity image.

TABLE 2

Summary of input parameters for the workflow and their values for the results presented here.

| Parameter | Definition | Value |
| --- | --- | --- |
| $\beta_r^{min}$ | Relative dip for computing threshold length-scale $L^{min}$ for filtering non-physical closed contours; $L_{min} \equiv 2(r_{bh} + EPL)\tan\beta_r^{min}$ | 88° |
| $R2_{min}$ | Threshold correlation coefficient for filtering spurious closed and open contours | 0.8-0.9 |

TABLE 2-continued

Summary of input parameters for the workflow and
their values for the results presented here.

| Parameter | Definition | Value |
|---|---|---|
| m | Number of harmonics for approximating a closed contour | 4 |

As may be understood, the various techniques described above relating to automatic structural interpretation of sinusoidal, bulls-eye, and/or reverse bulls-eye features observed in azimuthal borehole images are provided as examples. Accordingly, it should be understood that the present disclosure should not be construed as being limited to just the examples provided herein. Further, it should be appreciated that automatic structural interpretation techniques according to the present disclosure may be implemented in any suitable manner, including hardware (suitably configured circuitry), software (e.g., via a computer program including executable code stored on one or more tangible computer readable medium), or by using a combination of both hardware and software elements. Further, it should be expressly understood that the various automatic structural interpretation techniques described herein may be implemented on a downhole processor (e.g., a processor that is part of a wellbore deployed logging/imaging tool), with the results communicated to the surface by any suitable telemetry technique. Additionally, in other embodiments, borehole image data may be transmitted from the instrument in the wellbore to surface using telemetry, and the automatic structural interpretation methods may be performed at the surface using a surface-deployed computer (e.g., part of control system 154 in FIG. 1).

The specific embodiments described above are only intended to serve as examples. It will be appreciated that many modifications and other embodiments will come to the mind of one skilled in the art having the benefit of the foregoing description and the associated drawings. Accordingly, it is understood that various modifications and embodiments are intended to be included within the scope of the appended claims, and that the scope of the present disclosure shall be limited only by such appended claims.

What is claimed is:

1. A method comprising:
accepting as input to a processor an azimuthally substantially continuous wellbore image obtained using a well logging tool moved along a wellbore penetrating a subsurface formation;
in the processor, extracting contours from the substantially azimuthally continuous image;
in the processor, grouping the extracted contours into clusters corresponding to a single transition zone; and
in the processor, mapping the clustered contours having a measured depth extent that is greater than a length-scale over which a dip of the subsurface formation varies to a three-dimensional space corresponding to a coordinate system associated with the well;
in the processor, for extracted contours having a measured depth extent that is less than the length-scale over which the dip of the subterranean formation varies, estimating relative dip and apparent azimuth based on a first harmonic approximation of a contour; and
in the processor, calculating a dip and azimuth of a layer boundary of the subsurface formation from the mapped clustered contours and at least one of storing and displaying the calculated dip and azimuth.

2. The method of claim 1, wherein the contours comprise at least one of open contours, closed contours and combinations thereof.

3. The method of claim 1 further comprising, in the processor, prior to grouping the extracted contours into the clusters, filtering the extracted contours to remove spurious contours resulting from the extraction.

4. The method of claim 3, wherein the filtering comprises computing a Fourier series approximation for each extracted contour, and filtering out contours for which a quality of fit parameter is less than a selected threshold.

5. The method of claim 1, wherein the well logging tool comprises at least one of a resistivity tool, a density tool and a photoelectric factor tool.

6. The method of claim 1, wherein the extracting the contours is performed using at least one of a marching-squares algorithm, a square tracing algorithm, a Moore-Neighbor algorithm, a radial sweep algorithm, a Theo Pavlidis' algorithm, an asymptotic decider algorithm, a cell-by-cell algorithm, and combinations thereof.

7. The method of claim 1, wherein the well logging tool comprises a logging-while-drilling tool.

8. The method of claim 1, wherein the well logging tool comprises a wireline tool, and wherein the azimuthally substantially continuous borehole image is obtained by processing azimuthally non-continuous borehole images using an in-painting algorithm.

9. A method for determining dip and azimuth of a subsurface formation, comprising:
moving a well logging tool along an interior of a wellbore penetrating the subsurface formation to generate a substantially azimuthally continuous image from measurements made by the well logging tool;
in a processor, extracting contours from the substantially azimuthally continuous image;
in the processor, grouping the extracted contours into clusters corresponding to a single transition zone;
in the processor, mapping the clustered contours having a measured depth extent that is greater than a length-scale over which a dip of the subsurface formation varies to a three-dimensional space corresponding to a coordinate system associated with the well;
in the processor, for extracted contours having a measured depth extent that is less than the length-scale over which the dip of the subterranean formation varies, estimating relative dip and apparent azimuth based on a first harmonic approximation of a contour; and
in the processor, calculating a dip and azimuth of a layer boundary of the subsurface formation from the mapped clustered contours and at least one of storing and displaying the calculated dip and azimuth.

10. The method of claim 9, wherein the contours comprise at least one of open contours, closed contours and combinations thereof.

11. The method of claim 9 further comprising, in the processor, prior to grouping the extracted contours into the clusters, filtering the extracted contours to remove spurious contours resulting from the extraction.

12. The method of claim 11, wherein the filtering comprises computing a Fourier series approximation for each extracted contour, and filtering out contours for which a quality of fit parameter is less than a selected threshold.

13. The method of claim 9, wherein the well logging tool comprises at least one of a resistivity tool, a density tool and a photoelectric factor tool.

14. The method of claim 9, wherein the extracting the contours is performed using at least one of a marching-squares algorithm, a square tracing algorithm, a Moore-Neighbor algorithm, a radial sweep algorithm, a Theo Pavlidis' algorithm, an asymptotic decider algorithm, a cell-by-cell algorithm, and combinations thereof.

15. The method of claim 9, wherein the well logging tool comprises a logging-while-drilling tool.

16. The method of claim 15 wherein the moving the well logging tool comprises operating the well logging tool while drilling the wellbore.

17. The method of claim 9, wherein the well logging tool comprises a wireline tool, and wherein the azimuthally substantially continuous borehole image is obtained by processing azimuthally non-continuous borehole images using an in-painting algorithm.

18. A system for determining dip and azimuth of a subsurface formation, comprising:
  a processor programmed to accept as input thereto an azimuthally substantially continuous wellbore image obtained using a well logging tool moved along a wellbore penetrating a subsurface formation;
  the processor programmed to extract contours from the substantially azimuthally continuous image;
  the processor programmed to group the extracted contours into clusters corresponding to a single transition zone;
  the processor programmed to map the clustered contours having a measured depth extent that is greater than a length-scale over which a dip of the subsurface formation varies to a three-dimensional space corresponding to a coordinate system associated with the well;
  the processor programmed to estimate relative dip and apparent azimuth based on a first harmonic approximation of a contour having a measured depth extent that is less than the length-scale over which the dip of the subterranean formation varies; and
  the processor programmed to calculate a dip and azimuth of a layer boundary of the subsurface formation from the mapped clustered contours and at least one of storing and displaying the calculated dip and azimuth.

* * * * *